United States Patent
Kawazu

[15] 3,653,749
[45] Apr. 4, 1972

[54] VARIABLE-MAGNIFICATION AFOCAL OPTICAL LENS SYSTEM

[72] Inventor: Motoaki Kawazu, Tokyo, Japan
[73] Assignee: Ricoh Co., Ltd., Tokyo, Japan
[22] Filed: Aug. 3, 1970
[21] Appl. No.: 60,699

[30] Foreign Application Priority Data

Aug. 2, 1969  Japan..................................44/61217

[52] U.S. Cl..............................350/184, 350/212, 350/220
[51] Int. Cl.........................................................G02b 15/14
[58] Field of Search..................................350/184, 186, 212

[56] References Cited

UNITED STATES PATENTS 3,367,734  2/1968  Bystricky et al. ..................350/212 X
2,235,364  3/1941  Gramatzki..............................350/184

*Primary Examiner*—John K. Corbin
*Attorney*—Henry T. Burke, Robert Scobey, Robert S. Dunham, P. E. Henninger, Lester W. Clark, Gerald W. Griffin, Thomas F. Moran, R. Bradlee Boal, Christopher C. Dunham and Thomas P. Dowd

[57] ABSTRACT

A variable-magnification afocal optical lens system which may be used in combination with a photographic lens of a motion-picture camera using 8 mm film or a projection lens of a projector so that the compound focal length may be continuously varied with a zoom ratio of 2:1 and comprising two planoconvex lenses and two planoconcave lenses whose cost is comparatively low and arranged such that the image errors do not vary unacceptably in the shifting.

2 Claims, 14 Drawing Figures

INVENTOR.
MOTOAKI KAWAZU
BY
ATTORNEY

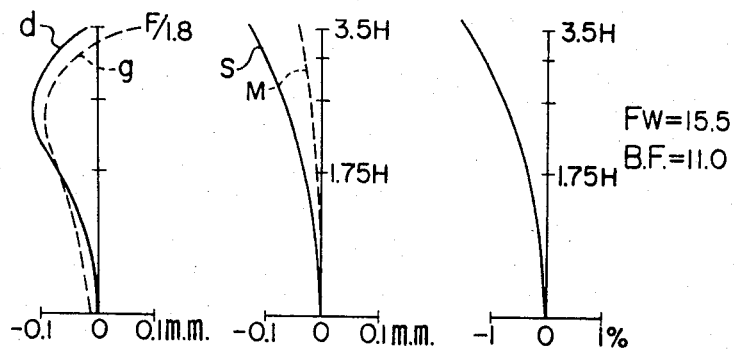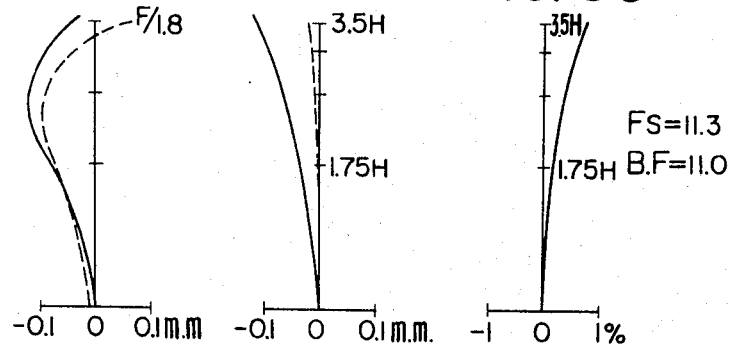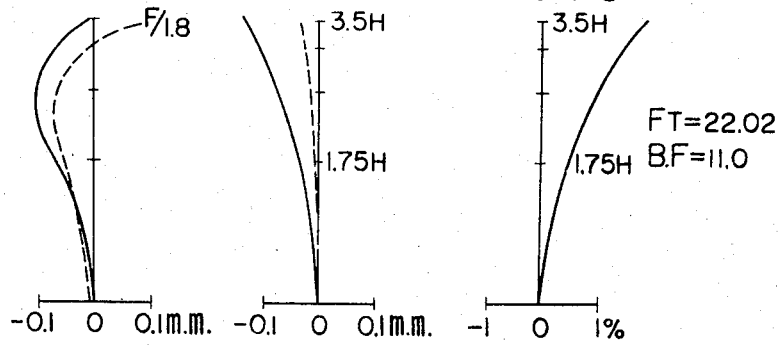

VARIABLE-MAGNIFICATION AFOCAL OPTICAL LENS SYSTEM

BACKGROUND OF THE INVENTION

The present invention relates to a variable-magnification afocal optical lens system for use with a photographic lens of a motion-picture camera using 8 mm film or a projection lens of a projector.

Variable-magnification afocal optical lens systems for use with motion-picture cameras and projectors must be simple in construction, compact in size and light in weight and especially inexpensive to manufacture. Furthermore, the image errors must not vary too much in the shifting and the characteristics of the photographic or projection lens must not be adversely affected when the afocal lens system is attached. Accordingly, the present invention provides a variable-magnification afocal optical lens system whose cost is extremely low as compared with that of conventional afocal lens systems of the same type, while the variation in image error in the shifting may be minimized. In addition, the present lens system may be very simple in construction and assembly.

SUMMARY OF THE INVENTION

The variable-magnification afocal optical lens system of the present invention consists of four lens elements in four groups, the first lens being a planoconvex meniscus lens whose convex surface faces toward the subject; the second lens is a planoconcave meniscus lens whose convex surface faces toward the image and which may be axially shifted; the third lens is a planoconvex meniscus lens whose convex surface faces toward the subject and which may be shifted in response to the shifting of the second lens in predetermined relationship therewith; and the fourth lens is a planoconcave meniscus lens whose concave surface faces toward the image. The intended zoom ratio is 2:1. Since all of the elements are meniscus shaped lenses having flat surfaces, these lenses may be manufactured in a simple manner and their assembly much facilitated so that the cost of the afocal lens system of the present invention may become very low compared with the conventional system while the variation in image errors in the shifting may be minimized.

The present invention will become more apparent from the following description of the preferred embodiment thereof taken in conjunction with the accompanying drawing.

BRIEF DESCRIPTION OF THE DRAWING

FIGS. 4A–C, FIGS. 5A–C and FIGS. 6A–C are image error diagrams respectively as in FIGS. 3A–C, of the compound lens system consisting of the variable-magnification afocal lens system shown in FIG. 2 and the focusing lens system; FIGS. 4A–C illustrating the errors at the minimum compound focal length; FIGS. 5A–C illustrating the errors at the medium compound focal length; and FIGS. 6A–C illustrating the errors at the maximum compound focal length.

DESCRIPTION OF THE PREFERRED EMBODIMENT

Figure 1:
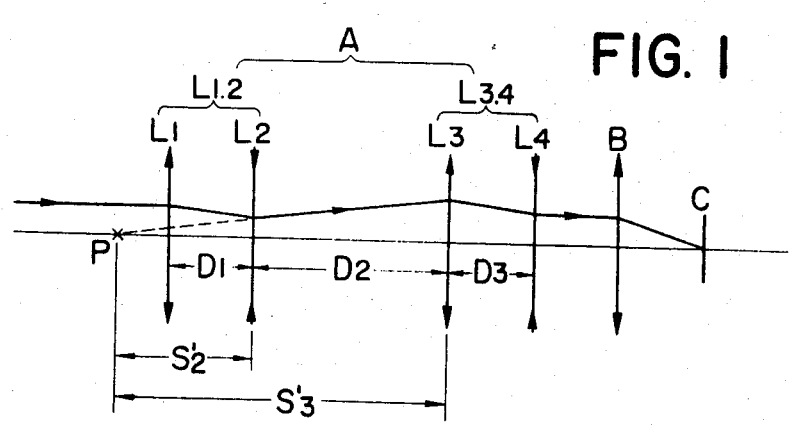
FIG. 1 is a diagrammatic view of a lens arrangement explaining the principles of the present invention.

Referring to FIG. 1, the magnification of an image at a focal plane C may be continuously varied by the combination of a variable-magnification afocal optical lens system A consisting of four lenses, $L_1$, $L_2$, $L_3$ and $L_4$, and a focusing lens system B. The lenses $L_1$ and $L_3$ are positive or converging lenses while the lenses $L_2$ and $L_4$ are negative or diverging lenses, and the lenses $L_1$ and $L_4$ are stationary while the lens $L_2$ may be axially shifted toward the image and the lens $L_3$ may be shifted toward the subject in a predetermined relation with the shifting of the lens $L_2$. The intended zooming ratio is 2:1.

The lens system $L_{1-2}$ consisting of the stationary and movable lenses $L_1$ and $L_2$ must be designed as the diverging system while the lens system $L_{3-4}$ consisting of the movable and stationary lenses $L_3$ and $L_4$ must be designed as the converging system. Furthermore, the lens system A must satisfy the following condition in order to provide an afocal system:

$$S_3' - S_2' = D_2$$

where $S_3'$ is a distance from the focal point P of the lens system $L_{3-4}$ to the lens $L_3$;

$S_2'$ is a distance from the focal point P to the lens $L_2$; and $D_2$ is the distance of air space between the lenses $L_2$ and $L_3$. That is, $$D_2 = \frac{f_3(f_4 + D_3)}{f_4 - f_3 + D_3} = \frac{f_2(f_1 - D_1)}{f_1 + f_2 - D_1}$$

where $f$ indicates the focal length of the particular lens identified by the subscript; and $D_1$ is the distance of the air space between the lenses $L_1$ and $L_2$.

The overall length $K$ of the afocal system is:

$$K = D_1 + D_2 + D_3.$$

From the above Eqs. $D_2$ and $D_3$ may be obtained by substituting the distance $D_1$.

The power $M$ of the afocal lens system is given by $$M = f_{1-2}/f_{3-4}$$

where $f_{1-2}$ and $f_{3-4}$ are the focal lengths of the lens systems $L_{1-2}$ and $L_{3-4}$ respectively.

Figure 2:
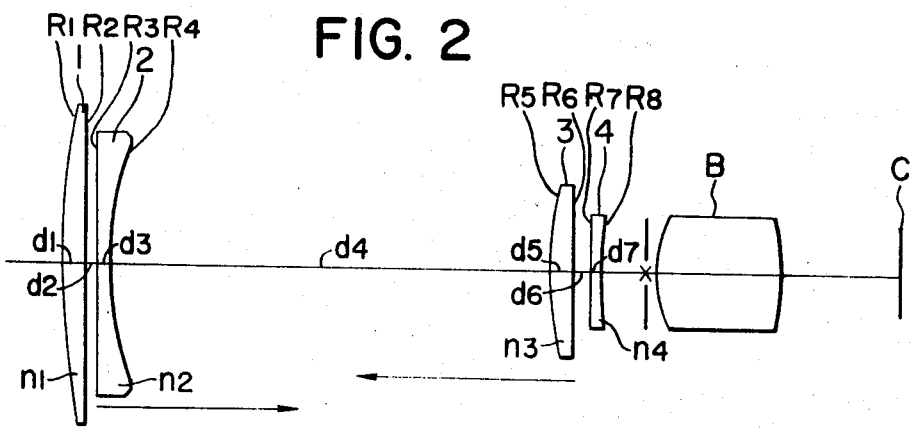
FIG. 2 is a sectional view of one embodiment of the present invention.

FIG. 2 illustrates one embodiment of the present invention wherein the first and third lenses 1 and 3 are planoconvex meniscus lenses whose convex surfaces are facing toward the subject while the second and fourth lenses 2 and 4 are planoconcave meniscus lenses whose concave surfaces are facing toward the image.

The relationships of the various qualities and arrangement of the lenses shown are as follows:

| | | | |
|---|---|---|---|
| $R_1$=69.795 | $d_1$=2.3 | $n_1$=1.62041 | $v_1$=60.3 |
| $R_2$=∞ | $d_2$=1.0 to 17.6 | | |
| $R_3$=∞ | $d_3$=1.0 | $n_2$=1.62374 | $v_2$=47.0 |
| $R_4$=28.227 | $d_4$=5.9 to 39.0 | | |
| $R_5$=29.995 | $d_5$=2.0 | $n_3$=1.62041 | $v_3$=60.3 |
| $R_6$=∞ | $d_6$=1.3 to 17.9 | | |
| $R_7$=∞ | $d_7$=1.0 | $n_4$=1.62374 | $v_4$=47.0 |
| $R_8$=50.020 | | | | where $R$ indicates the radius of curvature of the particular surface identified by the respective subscript in FIG. 2;

$d$ indicates the thickness or the distance along the axis of air space as identified by the respective subscript in FIG. 2;

$n$ indicates the refractive index of the particular lens identified by the respective subscript; and $v$ indicates the Abbe's number of the particular lens identified by the respective subscript.

Also, $d_2$, and $d_6$ have the following relationship:

$$d_2 + d_4 + d_6 = 41.446$$

and $$d_4 = \frac{48.347(82.044 + d_6)}{33.697 + d_2} - \frac{1.313(d_6 - 33.697)}{d_2 - 65.209}$$

The power $M$ is given by:

$$M = \frac{f_{1-2}}{f_{3-4}} = \frac{1.313(d_6 + 33.697)}{d_2 - 65.209}$$

and

| M | −0.717X | −1X | −1.423X |
|---|---|---|---|

| | | | |
|---|---|---|---|
| $d_2$ | 1.0 | 8.6 | 17.6 |
| $d_3$ | 39.078 | 23.281 | 5.936 |
| $d_4$ | 1.368 | 9.565 | 17.91 |

Figures 3A, 3B, 3C:
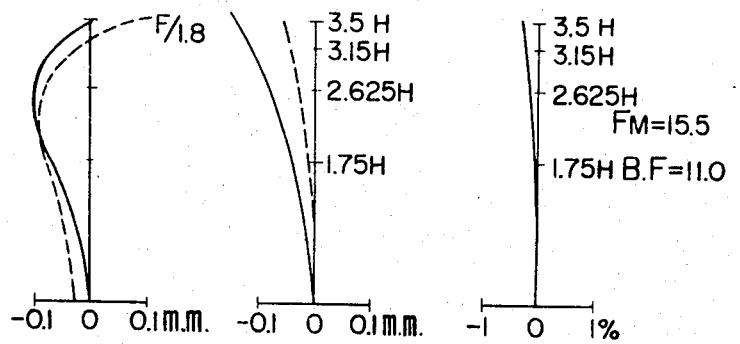
FIG. 3A, FIG. 3B and FIG. 3C are image error diagrams of the spherical aberration, astigmatism and distortion, respectively, of a focusing lens system which may be used in combination with the variable-magnification afocal optical lens system shown in FIG. 2.

When the afocal lens system shown in FIG. 2 is used in combination with the focusing lens system B, with $f = 15.5$ mm, back focus $= 11.0$, F/1.8 and image errors as shown in FIG. 3 and having the following coefficients of spherical aberration, coma, astigmatism, curvature of field and distortion:

| $\Sigma SI$ | $\Sigma SII$ | $\Sigma SIII$ | $\Sigma SIV$ | $\Sigma SV$ |
|---|---|---|---|---|
| 0.498 | 0.138 | −0.132 | 0.537 | 0.147, respectively; | there is provided for a motion-picture camera employing 8 mm film, a variable-magnification optical system with $f = 11$ to 22 mm, F/1.8 and a zoom ratio of 2:1. The image errors of the compound system (the afocal system A plus the focusing lens system B) are shown in FIGS. 4A–C, 5A–C and 6A–C. FIGS. 4A–C respectively illustrate the spherical aberration, astigmatism and distortion at the minimum compound focal length, while FIGS. 5A–C illustrate these respective errors at the intermediate compound focal length and FIGS. 6A–C illustrate these respective errors at the maximum compound focal length.

From these figures, it will be seen that the spherical aberration and astigmatism vary only slightly in the shifting. Seidel coefficients at the minimum, medium and maximum compound focal lengths $F_W$, $F_S$ and $FF_T$, respectively, are as follows:

| | $\Sigma S_1$ | $\Sigma S_2$ | $\Sigma S_3$ | $\Sigma S_4$ | $\Sigma S_5$ |
|---|---|---|---|---|---|
| $F_W = 11.03$ | 0.785 | 0.271 | −0.038 | 0.348 | 0.311 |
| $F_S = 15.5$ | 0.570 | 0.230 | −0.173 | 0.482 | −0.249 |
| $F_T = 22.02$ | 0.365 | 0.160 | −0.223 | 0.694 | −1.384 |

From this data, it is seen that the characteristics of the focusing lens system B are almost not affected.

It will therefore be seen that an improved variable-magnification afocal optical lens system is presented which is simple in construction, compact in size and light in weight, but which minimizes the image errors due to shifting.

While a preferred embodiment of the invention has been set forth, it will be understood by those skilled in the art that certain modifications may be made in the construction, arrangement and general combination of elements, such as proportionately reducing or increasing the radii of curvature of the lens surfaces and the thicknesses and spacing of the lenses without departing from the spirit and scope of the invention.

What is claimed is:

1. A variable-magnification afocal optical lens system of four individual elements in four groups, comprising from front to rear:
   a. a first element comprising a planoconvex meniscus lens whose convex surface faces toward the subject;
   b. a second element comprising a planoconcave meniscus lens whose concave surface faces toward the image and which is axially shiftable toward the image;
   c. a third element comprising a planoconvex meniscus lens whose convex surface faces toward the subject and which is shiftable in response to the shifting of said second element; and
   d. a fourth element comprising a planoconcave meniscus lens whose concave surface faces toward the image; and wherein the characteristics of the elements of said afocal system satisfy the following conditions:
   e. the radii of curvature of the successive surfaces are related in the respective proportions 69.795:infinity:infinity:28.227:29.995:infinity:infinity:and 50.020;
   f. the lens thicknesses and spacings along the optical axis are related in the respective proportions 2.3:1.0 to 17.6:1.0:5.9 to 39.0:2.0:1.3 to 17.9:1.0;
   g. the indices of refraction of the successive lenses are related in the respective proportions 1.62041:1.62374:1.62041:1.62374
   h. the Abbe's numbers of the respective lenses are 60.3:47.0:60.3:47.0.

2. A lens system as in claim 1, including a focusing lens system having a focal length of 15.5 mm, a back focal length of 11.0 mm and an F number of 1.8.

* * * * *